United States Patent [19]
Imanari et al.

[11] Patent Number: 5,572,373
[45] Date of Patent: Nov. 5, 1996

[54] PHOTOGRAPHING LENS SWITCHABLE BETWEEN MANUAL-FOCUS AND AUTO-FOCUS MODES

[75] Inventors: Hitoshi Imanari, Kawasaki; Hideo Kanno, Chiba; Tsuneo Watanabe, Yokohama; Shinichi Ushio, Yokohama; Yuichi Katagishi, Yokohama, all of Japan

[73] Assignee: Nikon Corporation, Tokyo, Japan

[21] Appl. No.: 481,159

[22] Filed: Jun. 7, 1995

Related U.S. Application Data

[60] Continuation of Ser. No. 77,863, Jun. 18, 1993, abandoned, which is a division of Ser. No. 791,548, Nov. 14, 1991, Pat. No. 5,227,829, which is a continuation-in-part of Ser. No. 648,035, Jan. 30, 1991, abandoned.

[30] Foreign Application Priority Data

Feb. 5, 1990 [JP] Japan ................. 2-010272 U
Nov. 19, 1990 [JP] Japan ................. 2-121114 U

[51] Int. Cl.$^6$ .............. G02B 7/02; G02B 15/14
[52] U.S. Cl. .............. 359/825; 359/696; 359/698; 359/823; 396/137
[58] Field of Search ............... 359/694–698, 359/703–706, 823, 825–827; 354/195.1–195.12, 400, 402, 408

[56] References Cited

U.S. PATENT DOCUMENTS

| | | | |
|---|---|---|---|
| 4,413,894 | 11/1983 | Miki et al. | 359/827 |
| 4,456,356 | 6/1984 | Okabe | 359/825 |
| 4,553,817 | 11/1985 | Ando et al. | 359/825 |
| 4,925,282 | 5/1990 | Kanno et al. | 359/698 |

*Primary Examiner*—James Phan
*Attorney, Agent, or Firm*—Shapiro and Shapiro

[57] ABSTRACT

A lens bodytube has an auto-focusing mode in which a photographing lens is automatically driven to an in-focus position by a drive force of a motor and a manual focusing mode in which the photographing lens is driven to the in-focus position by manually rotating a distance ring. A movable member is driven to a first position in the auto-focusing mode and to a second position in the manual focusing mode. When the movable member is at the first position, it is coupled to the motor to transmit a drive force of the motor to a rotary ring which drives the photographing lens along an optical axis. When the movable member is in the second position, it is coupled to the distance ring to transmit a manual drive force from the distance ring to the rotary ring. When the auto-focusing mode is set and the movable member is at the first position, the movable member is switched from the first position to the second position in response to manual rotation of the distance ring in order to enable manual focusing notwithstanding that the auto-focusing mode has been set.

7 Claims, 9 Drawing Sheets

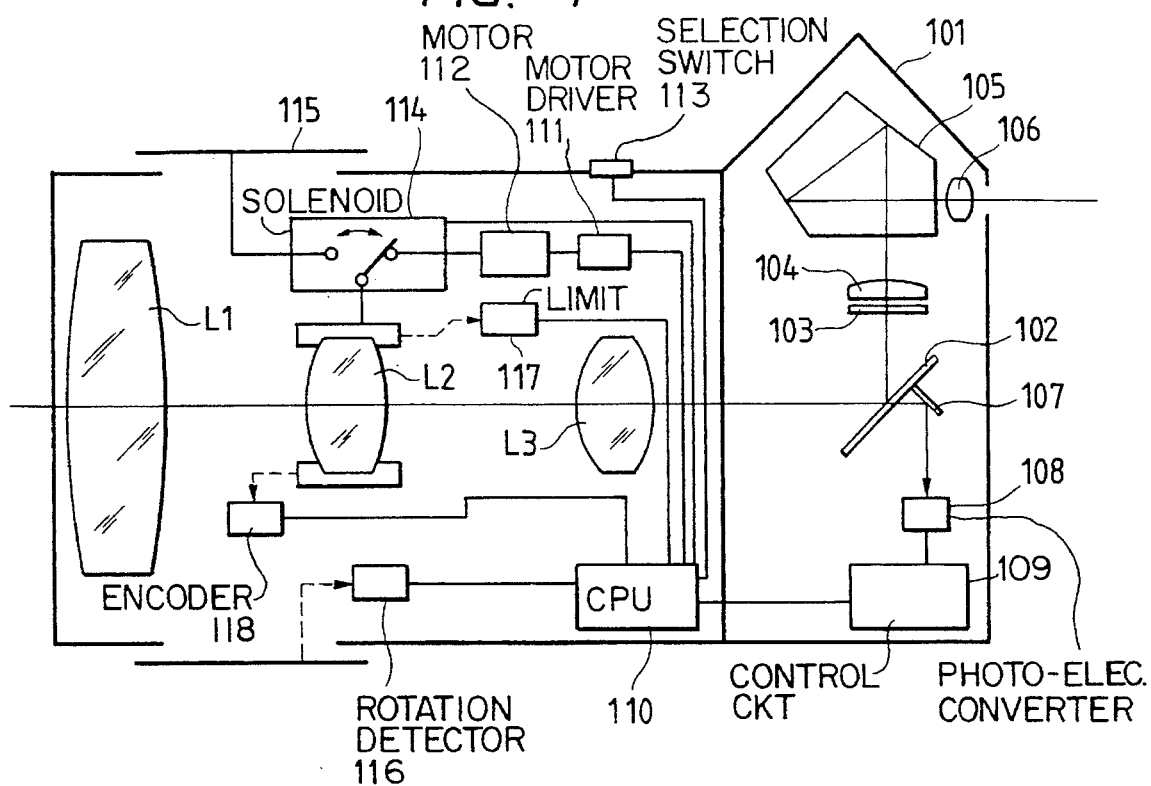
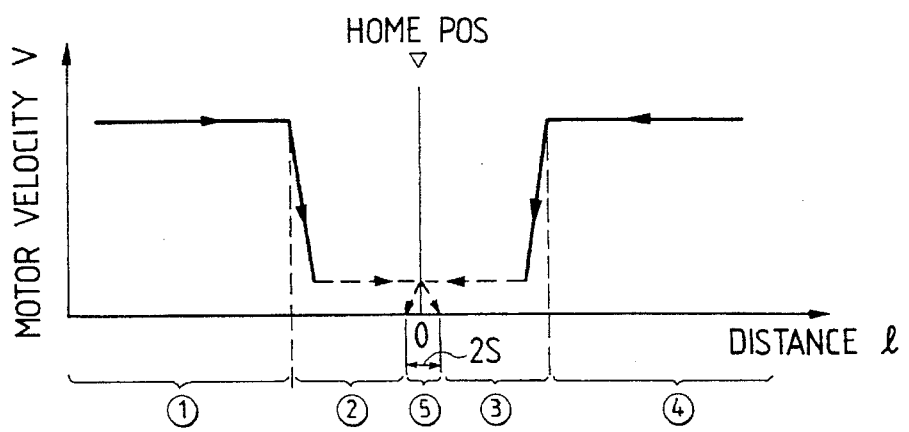

PHOTOGRAPHING LENS SWITCHABLE BETWEEN MANUAL-FOCUS AND AUTO-FOCUS MODES

This is a continuation of application Ser. No. 08/077,863 filed Jun. 18, 1993, now abandoned, which is a division of application Ser. No. 07/791,548 filed Nov. 14, 1991 (now U.S. Pat. No. 5,227,829), which is a continuation-in-part of application Ser. No. 07/648,035 filed Jan. 30, 1991 (abandoned).

BACKGROUND OF THE INVENTION

1. Field of the Invention

The present invention relates to switching between an automatic focusing (AF) mode and a manual focusing (MF) mode of a lens of a camera, and more particularly to a lens bodytube which uses an electrically driven clutch mechanism for such switching.

2. Related Background Art

In the technology disclosed in Japanese Laid-Open Patent Application No. 63-204209 filed by the assignee of the present invention, a switching member for the AF mode and the MF mode is arranged on a manual focusing ring, and the rotation of the manual focusing ring is inhibited in the AF mode.

In the above prior art, when an object which is difficult to be focused is to be photographed or intentionally defocused photograph is to be taken in the AF mode, it is necessary to manipulate a mode selection member to select the MF mode and hence it is difficult to quickly make the manual photographing.

SUMMARY OF THE INVENTION

It is an object of the present invention to provide a lens bodytube which allows quick manual photographing in the AF mode.

It is another object of the present invention to provide a focusing device which stores a predetermined in-focus position to allow a quick focusing operation to the in-focus position.

In order to achieve the above objects, a lens bodytube of the present invention may comprise:

mode selection means (113) adapted to be manipulated to select a photographing mode for producing an electrical signal corresponding to the manipulation;

a focusing optical system (L2);

moving means (4) rotatable around an optical axis for moving the focusing optical system along the optical axis;

manipulation means (115) rotatable around the optical axis for driving the moving means through the rotation;

detection means (116) for detecting the manipulation of the manipulation means;

drive means (112) for rotating the moving means;

clutch means (114) rotatable in union with the moving means and displaceable between a first position to couple the moving means to the drive means and a second position to release the coupling and couple the moving means to the manipulation means in accordance with the electrical signal from the mode selection means; and control means (110) for setting one of at least a first mode for manual focusing and a second mode for auto-focusing with preference to the manual focusing, in accordance with the electrical signal produced by the mode selection means, and for controlling the clutch means.

When the first mode is selected by the mode selection means (113), the control means operates to set up the first mode and displaces the clutch means (114) to the second position, and when the second mode is selected by the mode selection means (113), the control means operates to set up the second mode and displaces the clutch means (114) to the first position. When the manipulation of the manipulation means (115) is detected by the detection means (116) in the second mode, the control means operates to switch the mode from the second mode to the first mode and displaces the clutch means (114) to the second position.

In accordance with the lens bodytube of the present invention, the manual focusing is permitted without additional switching operation when the manual manipulation ring is rotated during the auto-focusing, by setting the auto-focusing mode with preference to the manual focusing by the mode selection member.

BRIEF DESCRIPTION OF THE DRAWINGS

FIGS. 2 and 3 shows a structure (a sectional view taken along a direction of an arrow A in FIG. 1) of a manual focusing/auto-focusing selection clutch which uses a bistable solenoid in the embodiment, in which FIG. 2 shows a manual focusing mode and FIG. 3 shows an auto-focusing mode;

FIG. 4 is a diagram for explaining operations of auto-focusing, manual focusing and auto-focusing with preference to the manual focusing, with the lens bodytube being mounted on a camera body;

FIG. 6 shows graphs of relationship between a drive motor speed and displacements of the pattern and the brush, before and after the positioning;

DETAILED DESCRIPTION OF THE PREFERRED EMBODIMENTS

The preferred embodiments of the present invention are now explained with reference to the accompanying drawings.

Figure 1:
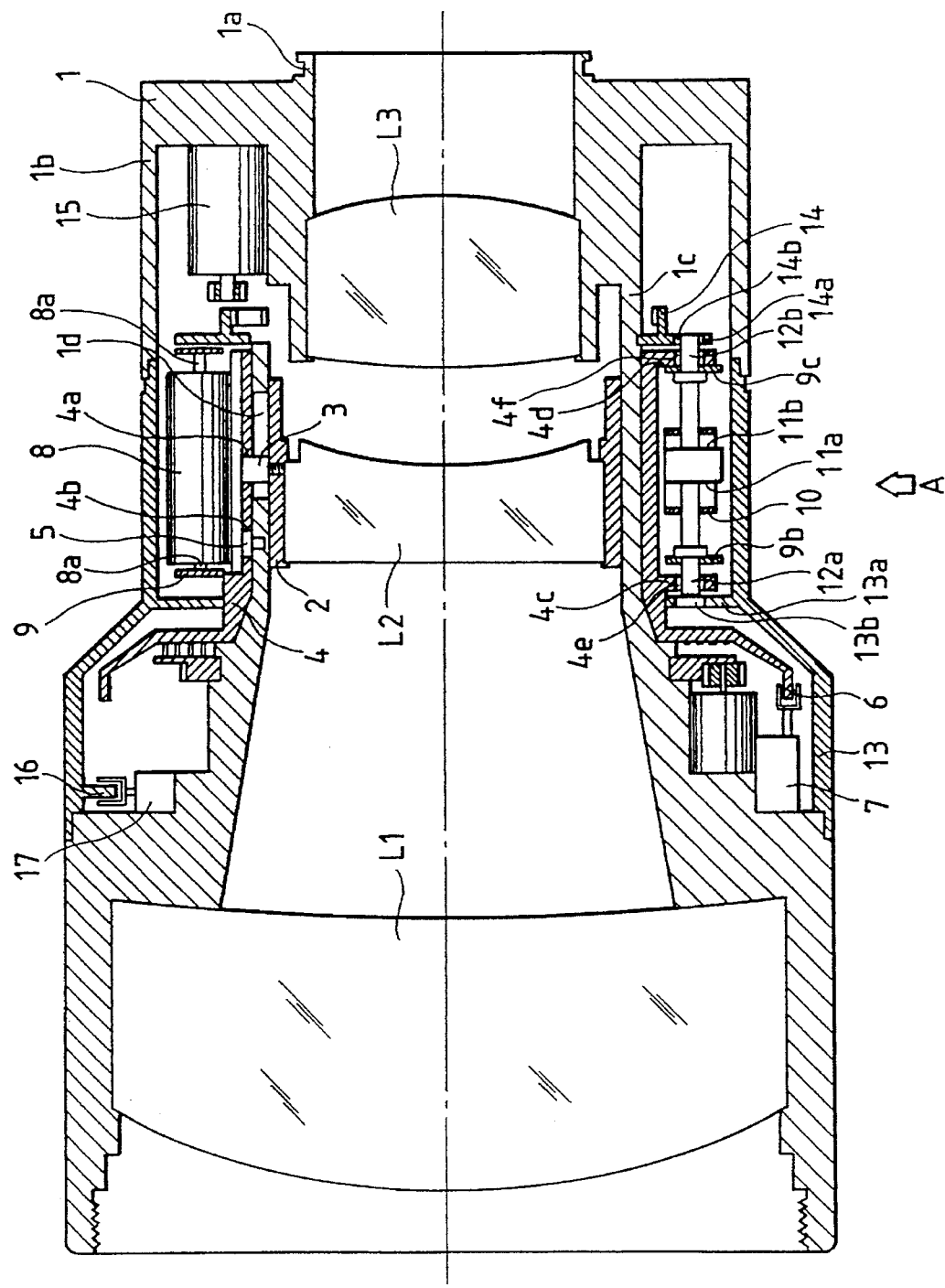
FIG. 1 shows a longitudinal sectional view of an embodiment of a lens bodytube of the present invention.
Figure 2:
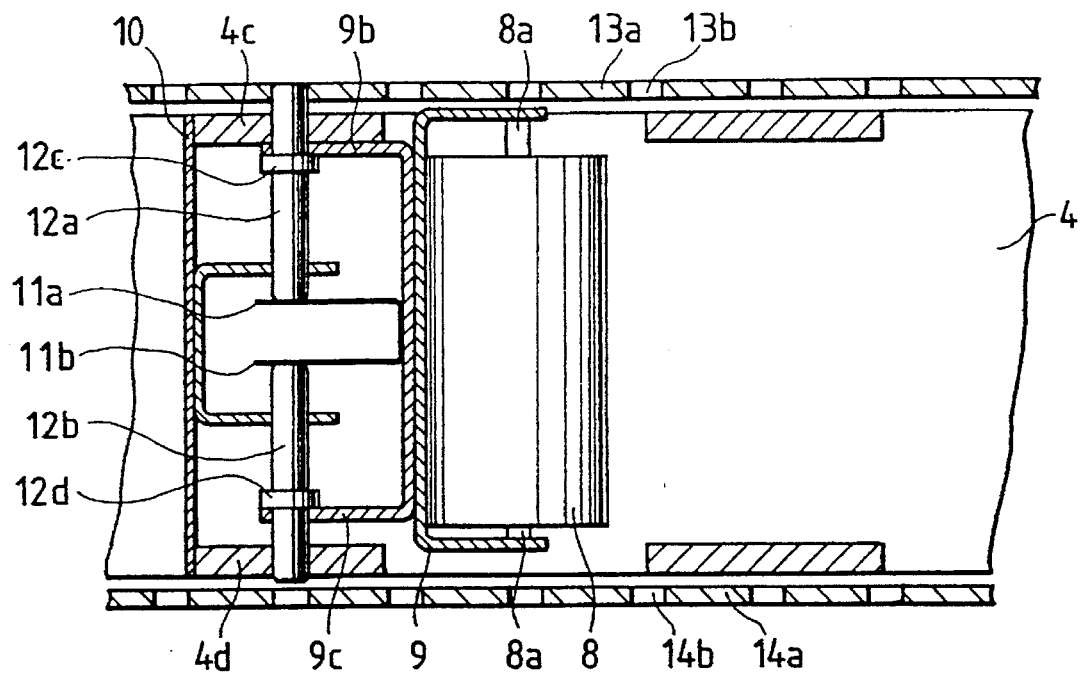
Figure 3:
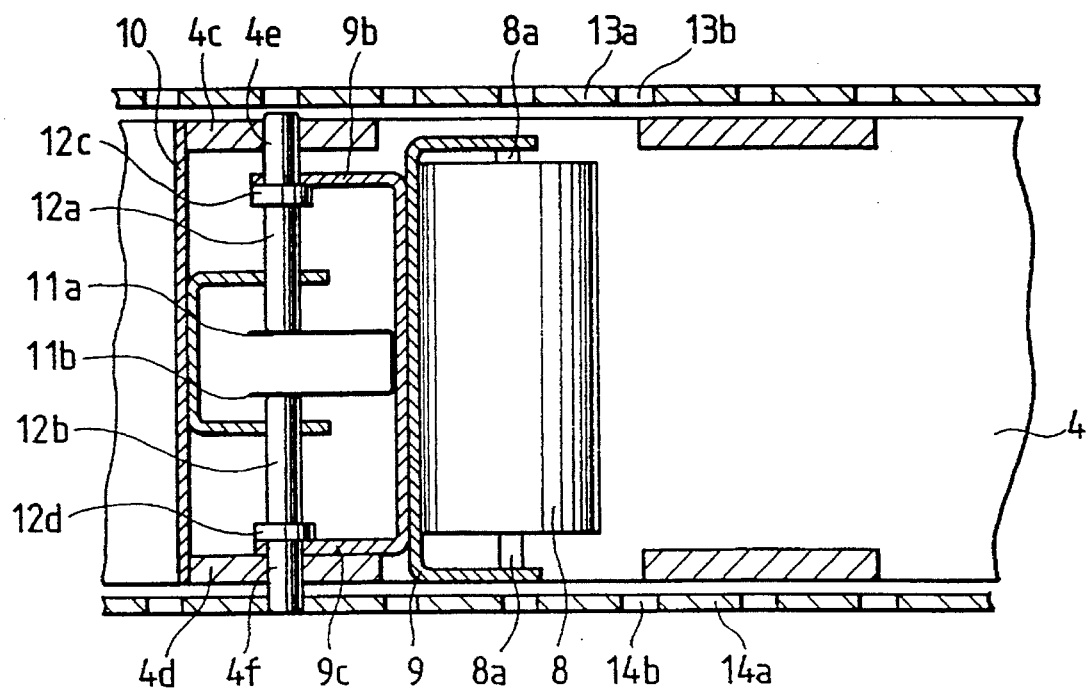

FIG. 1 shows a longitudinal sectional view of a lens bodytube of the present invention, and FIGS. 2 and 3 show structures (sectional views taken along a line A in FIG. 1) of a manual focusing (MF)-auto-focusing (AF) selection clutch which uses a bistable solenoid (hereinafter simply referred to as solenoid), in which FIG. 2 shows an MF mode and FIG. 3 shows an AF mode. FIG. 4 is a diagram for explaining operations of AF, MF and AF with preference to MF, with the lens bodytube of the present invention being mounted on a camera body.

In FIG. 1, a stationary tube 1 having a bayonet panel 1a for mounting it on the camera body comprises an outer tube 1b and an inner tube 1c. Photographing optical systems L1 and L3 are held on an inner periphery of the inner tube 1c, and a lens holding tube 2 for holding a focusing optical system L2 is slidably arranged.

A pin 3 is formed on the holding tube 2. The pin 3 fits to a straight guide groove 1d formed in the inner tube 1c and a lead groove 4a formed in a rotary tube 4 which rotatably fits to an outer periphery of the inner tube 1c. As the rotary tube 4 rotates, the focusing optical system L2 is moved along an optical axis into an in-focus position.

The movement of the rotary tube 4 along the optical axis is restricted by a peripheral groove 4b formed in the rotary tube 4 and a pin 5 which fits to the peripheral groove 4b and formed on the stationary tube 1, and the rotation around the optical axis is limited to a certain rotation angle.

On the other hand, a pattern 6 of an encoder 118 (FIG. 4) is arranged at a front of the rotary tube 4. A detector 7 for the pattern 6 of the encoder is provided in the inner tube 1c and it supplies signals such as a direction and angle of rotation of the rotary tube 4 to a CPU (which corresponds to 110 in FIG. 4) in an exchangeable lens (not shown).

A motor 15 is arranged in the inner tube 1c of the stationary tube 1 and the rotation thereof is transmitted to a segment gear 14 through a gear train (not shown).

A distance ring 13 which may be externally manipulated rotatably fits to the outer periphery of the stationary tube 1. An encoder pattern 16 which serves as rotation detection means is provided in the distance ring 13, and a detector 17 mounted on the stationary tube 1 detects signals such as a direction and an angle of rotation of the distance ring 13 and transmits them to the CPU (not shown) in the lens bodytube.

Referring to FIGS. 1 to 3, the structure of the MF-AF selection clutch which uses the bistable solenoid will now be explained.

A solenoid 8 is arranged on the outer periphery of the rotary tube 4, and a shaft 8a thereof is advanced or retracted along the optical axis by an electrical signal. A plate 9 which abuts against the shaft 8a is also advanced or retracted along the optical axis.

On the other hand, shafts 12a and 12b are held by the plate 9 and a plate 10 which is integral with the rotary tube 4, and they are advanced or retracted along the optical axis together with the shaft 8a, by bent portions 9b and 9c of the plate 9 which abut against middle portions 12c and 12d of the shafts 12a and 12b. Holes 4e and 4f are formed in projected portions 4c and 4d of the rotary tube 4, and the shafts 12a and 12b abut thereto, respectively.

A projected portion 13a of the distance ring 13 is arranged at the front of the projected portion 4c, and a projected portion 14a of the segment gear 4 is arranged at the rear of the projected portion 4d. Slots 13b and 14b which are on the same radial length as the shafts 12a and 12b to permit the fitting of the shafts are circumferentially formed in the projected portions 13a and 14a.

The projected portions 13a, 4c, 4d and 14a and the shafts 12a and 12b are positioned such that when the shafts 12a and 12b are at the forward position, the shaft 12a fits to the forward hole 4e of the rotary ring 4 and the hole 13b of the distance ring 13 while the shaft 12b does not fit to the hole 14b of the segment gear 14 (FIG. 2), and when the shafts 12a and 12b are at the backward position, the shaft 12b fits to the backward hole 4f of the rotary ring 4 and the hole 14b of the segment gear 14 while the shaft 12a does not fit to the hole 13b of the distance ring 13 (FIG. 3). When the shafts 12a and 12b are at the forward position, the distance ring 13 and the rotary ring 4 are rotated in union, and when those shafts are at the backward position, the segment gear 14 and the rotary ring 4 are rotated in union.

The shafts 12a and 12b are biased forward and backward, respectively, by abutments 11a and 11b of a leaf spring 11 arranged on the plate 9 so that the shafts 12a and 12b are smoothly fit to the holes 13b and 14b when the shafts 12a and 12b are advanced and retracted.

Because a plurality of holes 13b are formed in the distance ring 13 and a plurality of holes 14b are formed in the segment gear 14, the rotary ring 4 and the distance ring 13 or the segment gear 14 can be smoothly coupled whatever angular positions the rotary ring 4 and the distance ring 13 or the segment gear 14 may assume.

The operation of the present embodiment is explained with reference to FIG. 4 which shows a system diagram of a camera and a lens.

In the present embodiment, one of the following three modes may be selected by a mode selection switch 113 as a photographing mode related to focusing.

① auto-focusing (AF) mode
② manual focusing (MF) mode
③ AF mode with preference to MF The respective modes are now explained in sequence.

Auto-focusing (AF) Mode

When the AF mode is selected by an externally manipulated mode selection switch 113, a signal representing the AF mode is supplied to a CPU 110 in the lens, the CPU 110 activates a solenoid 114 and a drive force of a motor 112 is ready to be transmitted to the focusing optical system L2.

Specifically, in FIG. 1, the shaft 8a of the solenoid 8 is moved backward and the shafts 12a and 12b are also moved backward. Thus, the rotary ring 4 can be rotated only by the segment gear 14 which is rotated by the motor 15 (FIG. 3).

In FIG. 4, a light beam from an object passes through the photographing lens and reaches a half-mirror 102 of a camera body 101 where a portion of the light beam is reflected and an image of the object is focused on a focus plate 103. The object image is directed to an eye of a photographer through a condenser lens 104, a penta prism 105 and a finder lens 106.

A portion of the light beam which is transmitted through the half-mirror 102 is reflected by a sub-mirror 107 and is directed to a range finding photo-electric converter 108. An output signal from the photo-electric converter 108 is supplied to a known focusing control circuit 109 which determines a direction and an amount of drive of the focusing optical system L2. The drive signals are supplied to the CPU in the lens to drive the motor 112 (which corresponds to 15 in FIG. 1) through a motor driver 111 until the above drive amount is reached. As noted earlier, the CPU 10 receives from the encoder 118 signals such as the direction and angle of rotation of the rotary tube 4, the focusing optical system L2 moving as the rotary tube 4 rotates. When the drive is terminated, the focusing state is again detected, and if it is not in the in-focus state, the above operation is repeated until the in-focus state is attained.

A limit circuit 117 is provided for a rotation limiter of the rotary ring 4. When the focusing optical system L2 is at an infinite or very near position, a signal is sent to the CPU in the lens bodytube to reverse the drive direction of the focusing optical system L2.

In this manner, the focusing optical system L2 is driven in the AF mode to attain the in-focus state for the desired object.

Manual Focusing (MF) Mode

When the MF mode is selected by the externally manipulated mode selection switch 113, a signal representing the MF mode is supplied to the CPU 110 in the lens so that the CPU 110 actuates the solenoid 114 and the rotation of the distance ring 115 is ready to be transmitted to the focusing optical system L2.

Specifically, in FIG. 1, the shaft 8a of the solenoid 8 is moved forward and the shafts 12a and 12b are also moved forward. Thus, the rotary ring 4 can be rotated only by the distance ring 13 (FIG. 2). A photographer rotates the distance ring 13 while he/she watches the finder lens 106 to manually focus the photographing lens. The focusing control circuit 109 is inhibited at this time.

In this manner, the focusing optical system L2 is driven in the MF mode and the focusing of the desired object is attained by the manual operation of the photographer.

AF Mode with Preference to MF Mode

When the AF mode with preference to MF mode is selected by the externally manipulated mode selection switch 113, a signal representing the AF mode with preference to MF is supplied to the CPU 110 in the lens so that the CPU 110 actuates the solenoid 114 as it does in the AF mode and the drive force of the motor 112 is ready to be transmitted to the focusing optical system L2.

When it is desired to switch the mode to the MF mode during the AF mode due to inability to focusing and if the photographer does not manipulate the mode selection switch 113 but rotates the distance ring 115 like the MF mode, the rotation detector 116 detects the rotation of the distance ring 115 and supplies a detection signal to the CPU 110 in the lens. When the CPU 110 receives the detection signal, it immediately actuates the solenoid 114 to start the same mode as the MF mode. Namely, the focusing control circuit 109 is inhibited and the rotation of the distance ring 115 is ready to be transmitted to the focusing optical system L2. In this manner, the photographer can take photograph in the MF mode without switching the mode from the AF mode to the MF mode by the mode selection switch 113.

The return from the MF mode to the AF mode in the AF mode with preference to MF may be done by supplying from the CPU 110 in the lens a signal to switch for the MF mode to the AF mode when a predetermined time has elapsed since the rotation signal for the MF rotary ring issued last time so that the solenoid 114 is actuated to actuate the clutch, or supplying a signal produced by semi-depression of a release button of the camera body to the CPU in the lens so that the solenoid 114 is actuated to actuate the clutch.

In accordance with the present embodiment, when the AF mode with preference to MF is selected by the mode selection switch 113, the manual focusing can be attained during the AF mode by merely rotating the MF ring without requiring the selection operation. Accordingly, the normal photographing may be done in the AF mode, and for the photographing of an object which is hard to be focused or the intentionally defocused photographing, the MF ring may be rotated to smoothly attain the manual focusing. In this manner, the operability is improved.

Another embodiment of the present invention is now explained.

A structure of a lens bodytube in the present embodiment is briefly explained. The lens bodytube has functions of the auto-focusing (AF) mode and the manual focusing (MF) mode, and also has go-home mode function. A position of a photographing lens is stored when a focus preset switch SW1 is manipulated, and when a go-home switch SW2 is subsequently manipulated after the photographing lens has been moved to any position, the photographing lens is moved back to the stored lens position.

Figure 5:
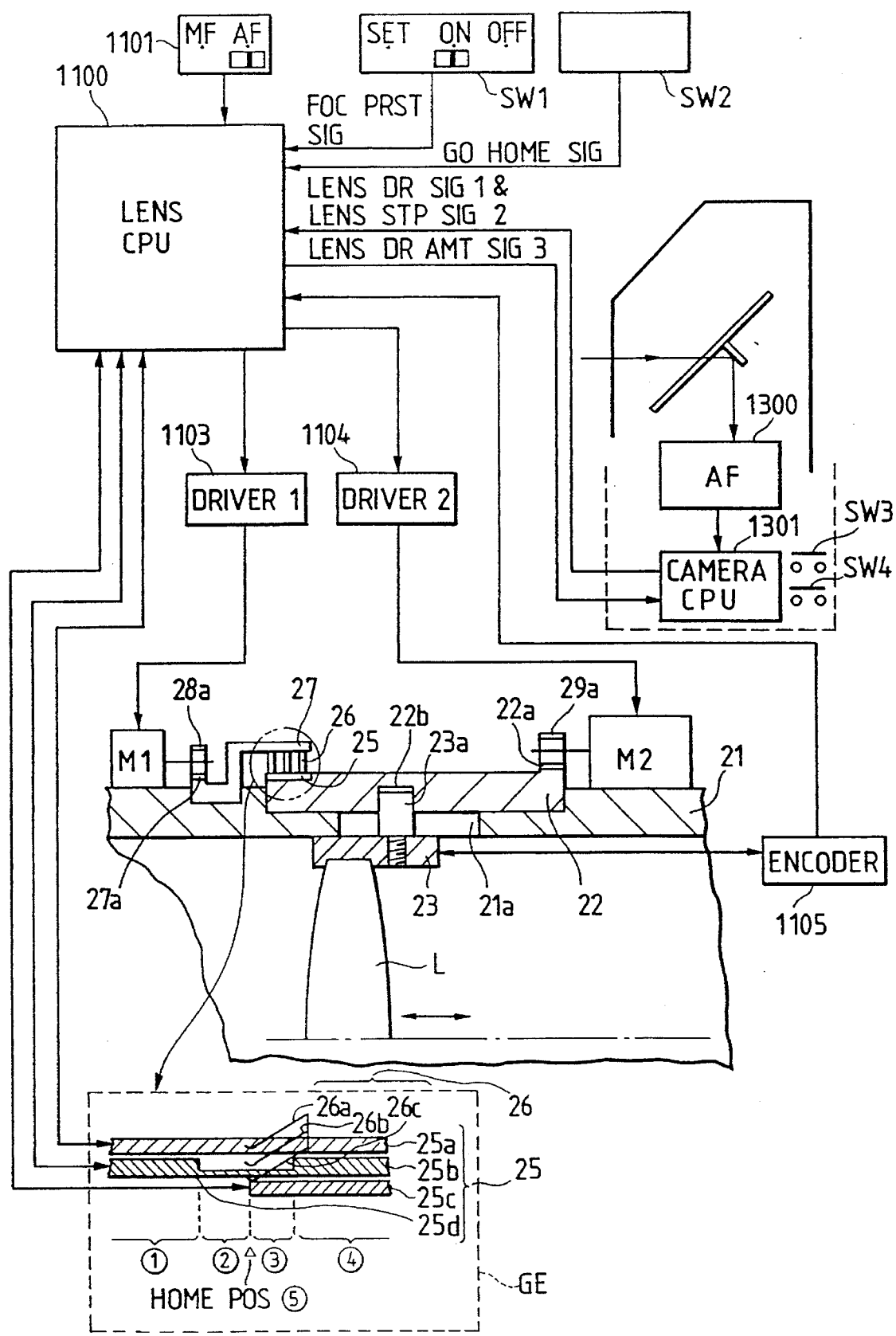
FIG. 5 shows a longitudinal sectional view of another embodiment of the lens bodytube, and a pattern and a brush for positioning.

FIG. 5 shows a longitudinal sectional view of the lens bodytube in the present embodiment and also shows a pattern and a brush for positioning, and FIG. 6 shows a relation between velocities of a drive motor and displacements of the pattern and the brush before and after the positioning.

In FIG. 5, a lens hold tube 23 for holding a focusing optical system L is slidably mounted on an inner periphery of a stationary tube 21. A pin 23a is formed on the hold tube 23 and it engages with a straight guide groove 21a of the stationary tube 21 and a lead groove 22b formed in a rotary tube 22 which rotatably fits to an outer periphery of the stationary tube 21.

An optical encoder 1105 is provided as means for detecting the position of the focusing optical system L. The encoder 1105 supplies signals such as a direction and an angle of rotation of the rotary tube 22 to a CPU 1100 in the lens.

A gear 22a which meshes with a drive shaft 29a of a motor M2 to drive the focusing optical system L is arranged on a right hand outer periphery of the rotary tube 22, and a pattern member 25 is arranged on a left hand outer periphery of the rotary tube 22. A rotary member 27 which is rotatable relative to the stationary tube 21 is provided on the left of the rotary tube 22, and a brush 26 is provided at the right end of the rotary member 27 and it contacts to the pattern 25. A gear 27a which meshes with a drive shaft 28a of a focus preset motor M1 is provided on the left hand outer periphery of the rotary member 27.

In FIG. 5, three conductors leading to the CPU 1100 in the lens are connected to the pattern member 25. They are a ground pattern 25a which normally contacts a brush 26a of the three-branch brush 26, conduction patterns 25b and 25d which contact a center brush 26b at positions ① and ④ in FIG. 5 excluding positions ② and ③ before and after a home position, respectively, and a pattern 25c which contacts a brush 26c at the positions ③ and ④.

A total length of ① and ② and a total length of ③ and ④ are long enough to assure the rotation of the rotary tube 22 to drive the lens from an infinite position to a very near position.

Further connected to the CPU 1100 in the lens of FIG. 5 are a mode selection switch SW 1101 for selecting the AF mode and the MF mode, a focus preset switch SW1 for presetting the focus, and a go-home switch SW2 for driving the lens to the home position (so-called go-home).

The focus preset switch SW1 has three selectable positions "set", "off" and "on". When it is at the "set" position, the lens position is stored, when it is at the "off" position, the go-home operation is inhibited even if the go-home switch SW2 is actuated, and when it is at the "on" position, the lens is driven to the stored lens position when the go-home switch SW2 is actuated. The switch SW1 is a slidable switch which is automatically reset from the "set" position to the "on" position but it is not automatically reset from the "off" position to the "on" position and always remains at one of the "on" position and the "off" position.

The go-home switch SW2 is a button switch which is kept on while it is depressed and causes the lens to be driven to the stored lens position if the focus present switch SW1 is at the "on" position, and which is kept off when the depression of the button is released. In this case, the above operation is stopped.

Further connected to the CPU 1100 in the lens are first and second drivers 1103 and 1104 for driving the motors M1 and M2, the encoder 1105 and a CPU 1301 in the camera body.

The operation of the above-described embodiment will now be described. First, in the AF mode, the AF mode is selected by a mode changeover switch SW1101. Thereby, a signal indicative of the AF mode is output to the CPU 1100 in the lens, and lens driving based on the defocus amount from the focus detector 1300 is effected.

Figure 7:
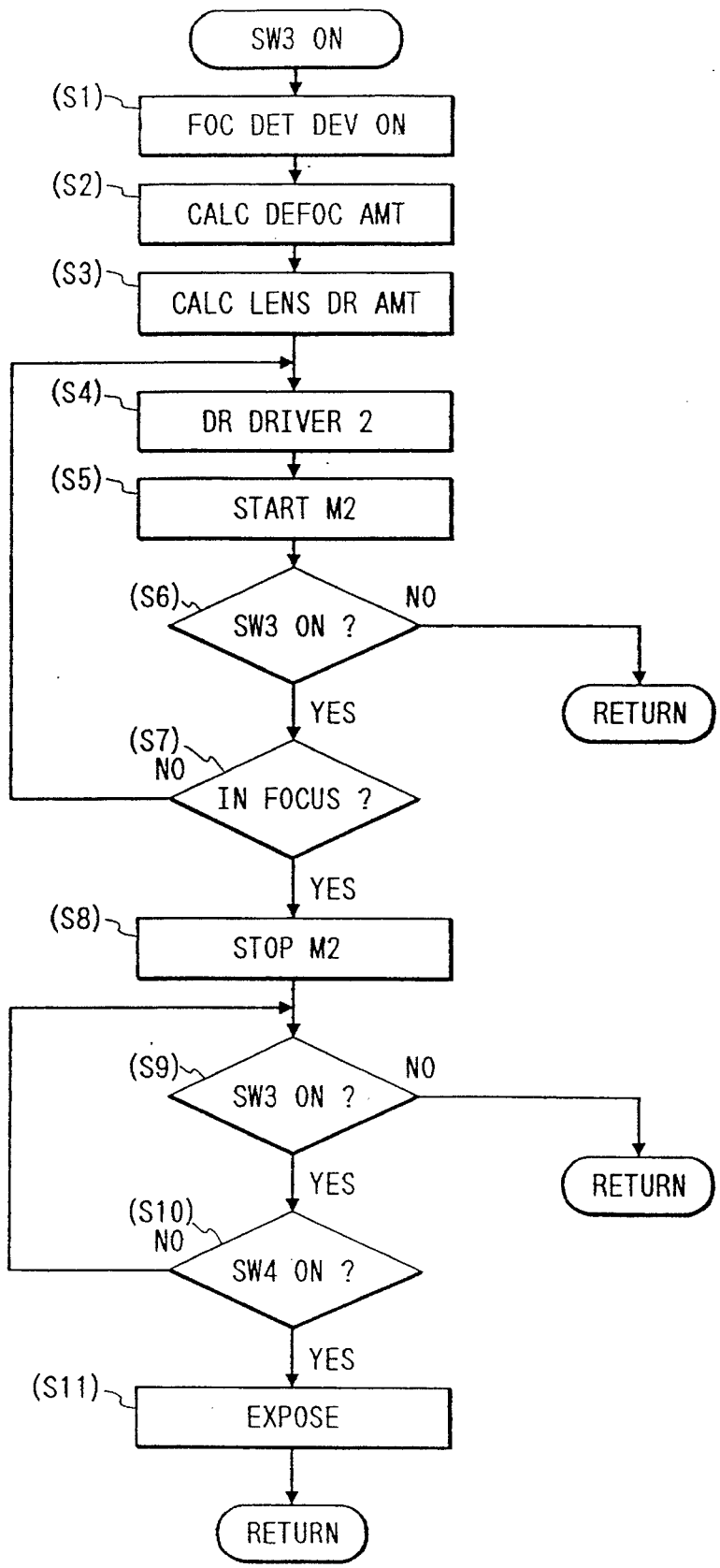
FIGS. 7 to 9 show flow charts of operations.

An operation in the normal AF mode is first explained with reference to the flow chart of FIG. 7. When the switch SW3 is turned on by the half-depression of the release button, a focus detector 1300 in the CPU 1301 is activated (step S1). As the focus detector 1300 is activated, a defocus amount is calculated (step S2) and a lens drive amount is calculated (step S3). The camera CPU 1301 supplies a lens drive signal SIG1 to the lens CPU 1100. Then, the second driver 1104 is activated (step S4) and the drive of the motor M2 is started under the control of the second driver 1104 (step S5). The lens drive amount is detected by the optical encoder 1105 and the detection signal is supplied to the lens CPU 1100, and it is sent to the camera CPU 1301 as a lens drive amount signal SIG3.

Whether the semi-depression switch SW3 is on or not is determined (step S6), and if the decision is YES, the lens drive amount signal SIG3 and the defocus amount are compared in the camera CPU 1301 to determine whether the photographing lens L is in the in-focus state or not (step S7). If the decision is YES, a lens drive stop signal SIG2 is sent to the lens CPU 1100 to stop the drive of the motor M2 (step S8).

In the driving of lens L, the rotation of the motor M2 is transmitted to the rotary tube 22 through the gears 29a and 22a. As the rotary tube 22 is rotated, the focusing lens L is driven along the optical axis by the lead groove 22b, the straight groove 21a and the pin 23a which fits thereto and is provided on a lens drive frame 23.

If the decision in the step S6 is NO, that is, if the semi-depression switch SW3 is not on, the process is terminated.

When the drive of the motor M2 is stopped in the step S8, whether the semi-depression switch SW3 is on or not is again determined (step S9). If the decision is YES, whether a full-depression switch SW4 is on or not is determined (step S10). If the decision is YES, the exposure operation including the shutter release is carried out (step S11).

If the decision in the step S9 is NO, namely, if the semi-depression switch SW3 is not on, the process is terminated, and if the decision in the step S10 is NO, the process returns to the step S9.

In this manner, the lens driving by AF is effected and the in-focus state to a desired object can be obtained.

The operation in the MF mode will now be described below. The lens bodytube in this embodiment is provided with an externally operable distance operating ring rotatably fitted to the outer periphery of the fixed tube as shown in FIG. 1, and detecting means for detecting signals indicative of the direction, angle, etc. of rotation of this distance operating ring and transmitting them to the CPU 1100 in the lens.

In the above described AF mode, the amount of lens driving is calculated from the defocus amount, and the motor M2 is driven on the basis of this amount of lens driving, whereby the focusing operation achieved.

The MF mode is similar to the AF mode in that lens driving is effected by the driving of the motor M2, but differs from the AF mode in that the amount of driving thereof is determined by the angle (amount) of rotation of the distance operating ring.

In the MF mode, the MF mode is selected by the mode changeover switch SW1101. Thereby, a signal indicative of the MF mode is output to the CPU 1100 in the lens to thereby bring about a state in which lens driving based on the amount of rotation of the distance operating ring is effected. When the distance operating ring is then rotatively operated, the direction and amount of this rotation are detected by detecting means, and the signal thereof is transmitted to the CPU 1100 in the lens. The CPU 1100 in the lens starts the driving of the motor M2 on the basis of the transmitted signal through the second driver 1104. At this time, the photographer rotates the distance operating ring while looking into the eyepiece of the finder, thereby effecting a manual focusing operation. If the rotation of the distance operating ring is stopped when the in-focus state is obtained, the driving of the motor M2 will be stopped and lens driving will be stopped. When the MF mode is being set, the operation of the focus detector 1300 is prohibited.

In this manner, the lens driving by MF is effected and the in-focus state to a desired object can be obtained.

Figure 8:
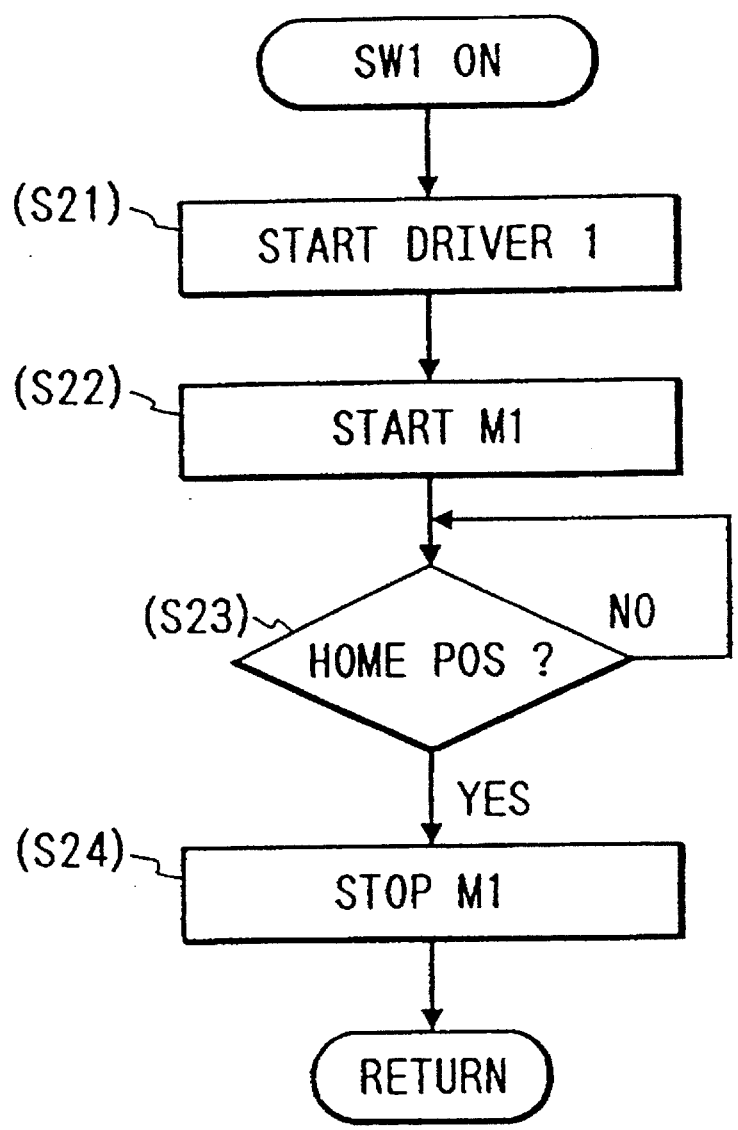

The operation of the focus preset is now explained with reference to the flow chart of FIG. 8. When the focus preset switch SW1 is switched to the "set" position at an appropriate stop position of the focusing lens, the focus preset signal is supplied to the lens CPU 1100. The CPU 1100 sends a drive signal to the first driver 1103 to activate it (step S21) and drive the focus preset motor M1 (step S22). As a result, the rotary member 27 and the brush 26 which is in union therewith are rotated by the gears 28a and 27a. Whether the brush 26 has reached the home position (the boundary of ② and ③ in FIG. 5) or not is determined (step S23), and if the decision is YES, the drive of the motor M1 is stopped (step S24).

If the decision in the step S23 is NO, namely, if the brush 26 has not reached the home position, the step 23 is repeatedly executed until the YES decision is obtained.

Thus, the lens position of the photographing lens L at the manipulation of the focus preset switch SW1 is stored as the set position of the brush 26 on the stationary tube 21 because the home position ⑤ of the pattern 5 indicates the position of the photographing lens L on the optical axis.

When the brush 26 (26a, 26b and 26c) is in the area ① of the pattern 25 (25a, 25b and 25c), the encoder GE supplies a signal "1, 1, 0" to the lens CPU 1100 so that the direction and speed of rotation of the brush 26 are set to the rightward direction (as seen in the cross-sectional view of the encoder GE in FIG. 5) at as high speed as possible. When the brush 26 is in the area ④ of the pattern 25, the encoder GE supplies a signal "1, 1, 1" to the lens CPU 1100 so that the brush is rotated leftward at as high speed as possible. When the brush 26 is in the area ② or ③ of the pattern 25, the encoder GE supplies a signal "1, 0, 0" or "1, 0, 1" to the lens CPU 1100 so that the brush 26 is rotated at a low speed. When the CPU 1100 detects the edge of the pattern 25, that is, when the change of the signal of the pattern 25c from "1" to "0" or from "0" to "1" is detected, the stop signal is supplied to the motor M1. The rotation of the motor M1 near the stop is set to be sufficiently low in the area ② or ③ and the overrun S of the brush 26 (see graph of FIG. 6) is sufficiently smaller than an equivalent value of a view field depth of the lens.

In this manner, the drive of the brush 26 is stopped at the home position ⑤ and the focus preset is completed.

It is preferable to import a highest priority of interruption to the focus preset command signal so that the go-home command or the AF mode command is inhibited by the lens CPU 1100 until the focus preset is completed.

After the focus preset has been completed, the normal AF mode is resumed and the photographing lens L is driven in accordance with the focus detection signal of the focus detector 1300. Thus, the pattern 25 which is linked to the photographing lens L is moved as the photographing lens L is driven and the relation of the brush 26 and the home position ⑤ of the pattern 25 changes from the coincident state to the non-coincident state. Since the brush 26 is stationary during this operation, the lens position of the photographing lens L preset by the focus presetting is kept stored.

Figure 9:
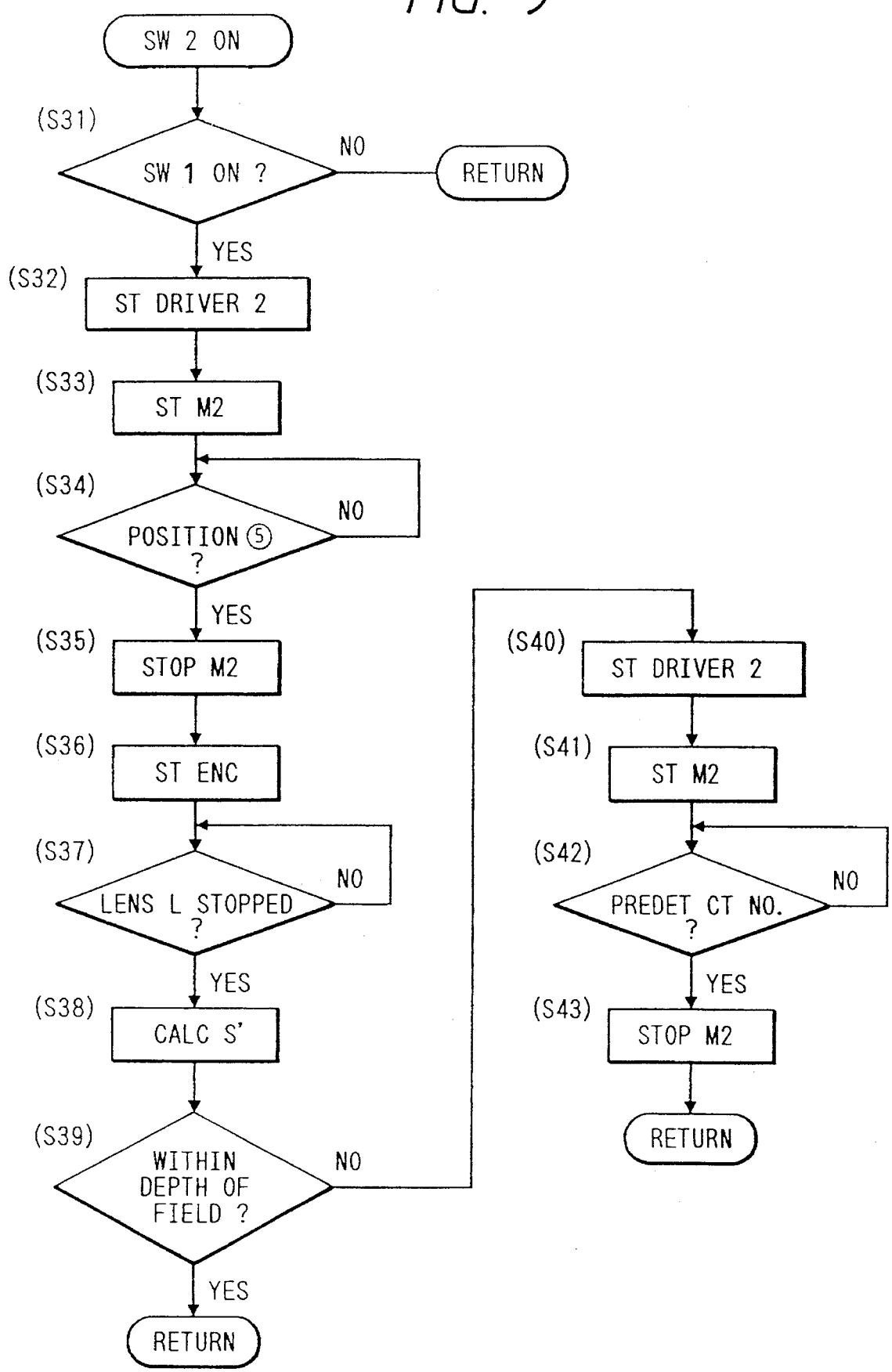

The go-home operation is now explained with reference to the flow chart of FIG. 9. When the go-home switch SW2 is actuated at an appropriate lens position after the focus preset, a go-home signal is produced. Whether the focus preset switch SW1 is at the "on" position or not is determined (step S31), and if the decision is YES, the lens CPU 1100 does not accept the drive signal SIG1 from the camera CPU 1301 while it receives the go-home signal, and activates the second driver 1104 depending on the positions of the pattern 25 and the brush 26 (step S32) to start to drive the motor M2 (step S33). The pattern 25 is rotated as opposed to the focus preset operation by the same drive mechanism as that in the AF mode. Whether the brush 6 has reached the boundary of ② and ③ (the home position ⑤ in FIG. 5) or not is determined (step S34), and if the decision is YES, the drive of the motor M2 is stopped (step S35).

Simultaneously with the production of the stop signal of the motor M2, the CPU 1100 begins to count the signal detected by the optical encoder 1105 (step S36). Whether the movement of the photo-taking lens L has been stopped is judged from the detection signal of the optical encoder 1105 (step S37), and if an affirmative result is obtained, the amount of movement S' of the photo-taking lens L corresponding to the count number detected by the optical encoder 1105 from the step S36 until the affirmative result of the step S37 is calculated by the CPU 1100 with the aid of said count number (step S38). Whether the amount of movement S' is within an amount of movement corresponding to the depth of field is judged (step S39), and if an affirmative result is obtained, go-home is completed. The rotation of the motor M2 near the stop is set to a sufficiently low speed at the position ② or ③ so that the overrun S of the pattern 25 (see graph of FIG. 6) is sufficiently smaller than an equivalent value of the view field depth of the lens.

Thus, in the area ② or ③, the rotation of the motor M2 is set to a sufficiently low speed and therefore, the amount of movement S' ought to be sufficiently within the amount of movement corresponding to the depth of field. However, a negative result may possibly be obtained and therefore, in this case, as a safe countermeasure, the second driver 1104 is again started (step S40), and the driving of the motor M2 is started in the direction opposite to the direction of rotation by the optical encoder 1105 (step S41). Whether the motor M2 has been rotated by an amount corresponding to the count number detected by the optical encoder 1105 is judged (step S42), and if an affirmative result is obtained, the driving of the motor M2 is stopped (step S43).

In this manner, the drive of the pattern 25 is stopped at the home position and the go-home operation is completed.

The direction and speed of rotation of the pattern 25 are set such that when the brush 26 is in the area ① of FIG. 5, the pattern is rotated leftward at the same speed as the drive speed in the AF mode, and when the brush 26 is in the area ② of FIG. 5, the pattern 25 is rotated leftward at as low speed as possible. When the brush 26 is in the area ④ of FIG. 5, the pattern 25 is rotated rightward at the same speed as the drive speed in the AF mode, and when the brush 26 is in the area ③, the pattern 25 is rotated rightward at as low speed as possible.

In the present system, the lens drive to the home position is carried out while the go-home switch SW2 is actuated, and the lens position is held at the home position after the completion of the drive, but when the actuation of the go-home switch SW2 is stopped, the go-home signal which has been supplied to the lens CPU 1100 is terminated. The lens CPU 1100 stops the drive of the motor M2 by the go-home signal and again accepts the lens drive signal SIG1 from the camera CPU 1301 and drives the motor M2 in response to the lens drive signal. As a result, the drive of the photographing lens L in the normal AF mode is carried out before the return operation of the photographing lens L by the go-home operation is completed. If the focus preset switch SW1 is again actuated thereafter, the brush 26 operates in the manner described above and a new lens position may be stored. The above operation may be repeated any time. The operation is same even if the lens bodytube is set in the MF mode by the mode selection switch SW 1101.

However, where as the construction of the lens bodytube, use is made of one as shown in FIG. 1, i.e., one having an AF-MF changeover clutch, the flow of the go-home operation during the setting of the MF mode is such as will be described below. Here, as regards the construction of the lens bodytube, description will be made with reference to FIG. 10, and as regards the flow of the go-home operation during the MF mode description will be described with reference to FIG. 11.

Figure 10:
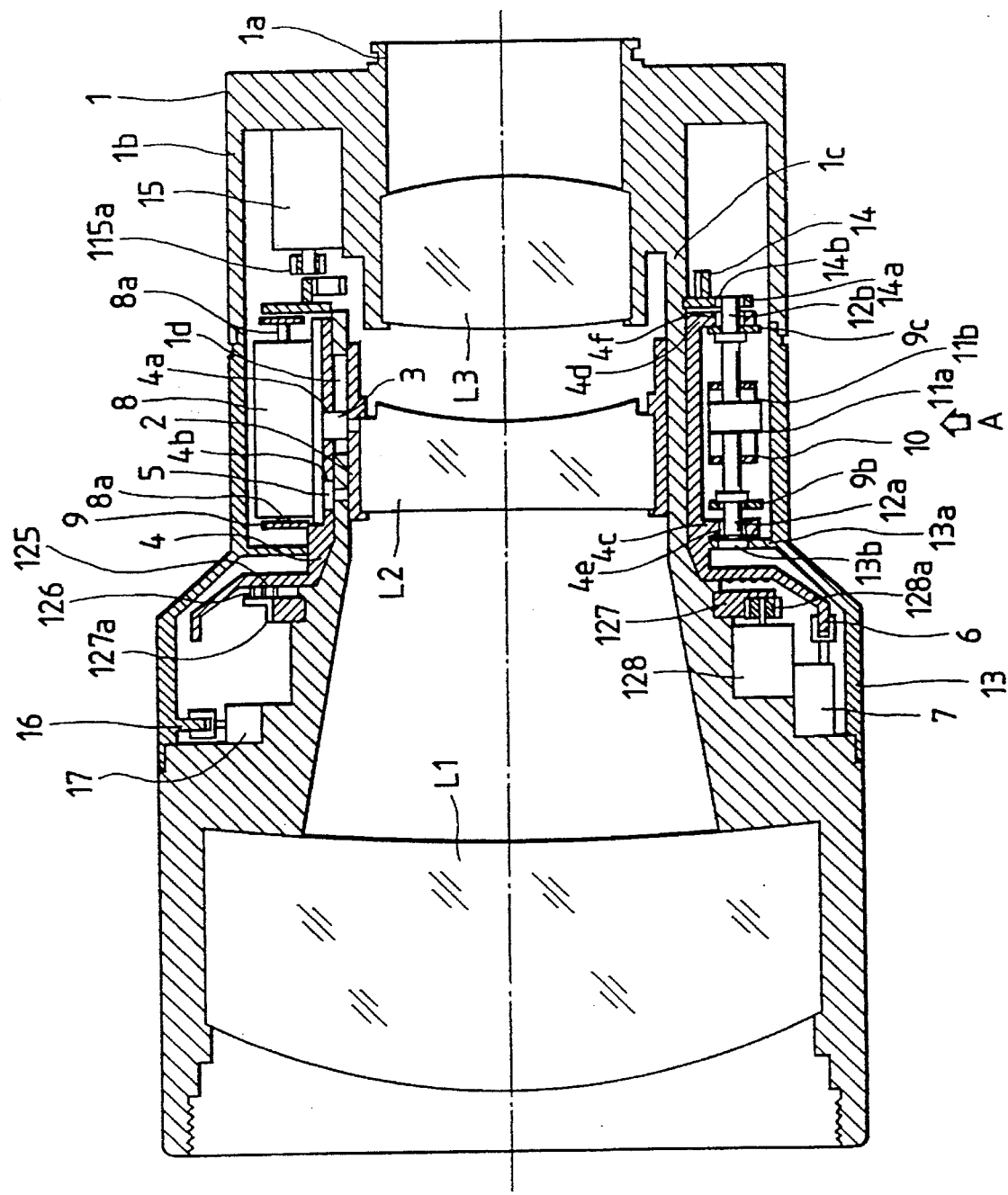
FIG. 10 shows a longitudinal cross-sectional view of a lens bodytube in another embodiment.

FIG. 10 shows a longitudinal cross-sectional view of a lens bodytube, and this lens bodytube does not differ in construction from that of FIG. 1, but differs only in those reference characters newly added. Accordingly, in the description of the lens bodytube shown in FIG. 10, constituent members overlapping those in FIG. 1 need not be described.

In FIG. 10, a pattern member 125 (corresponding to the pattern member 25 in FIG. 5) is provided on the fore end surface of the rotary tube 4. A rotary member 127 (corresponding to the rotary member 27 of FIG. 5) rotatable relative to the fixed tube 1 is provided at the left of the rotary tube 4, and a brush 126 (corresponding to the brush 26 of FIG. 5) is integrally provided on the right end surface of the rotary member 127 and is in contact with the pattern member 125. A gear 127a (corresponding to the gear 27a of FIG. 5) meshing with the drive shaft 128a of a motor 128 for focus presetting (corresponding to the motor M1 of FIG. 5) is provided on the outer periphery of the left end portion of the rotary member 127.

Figure 11:
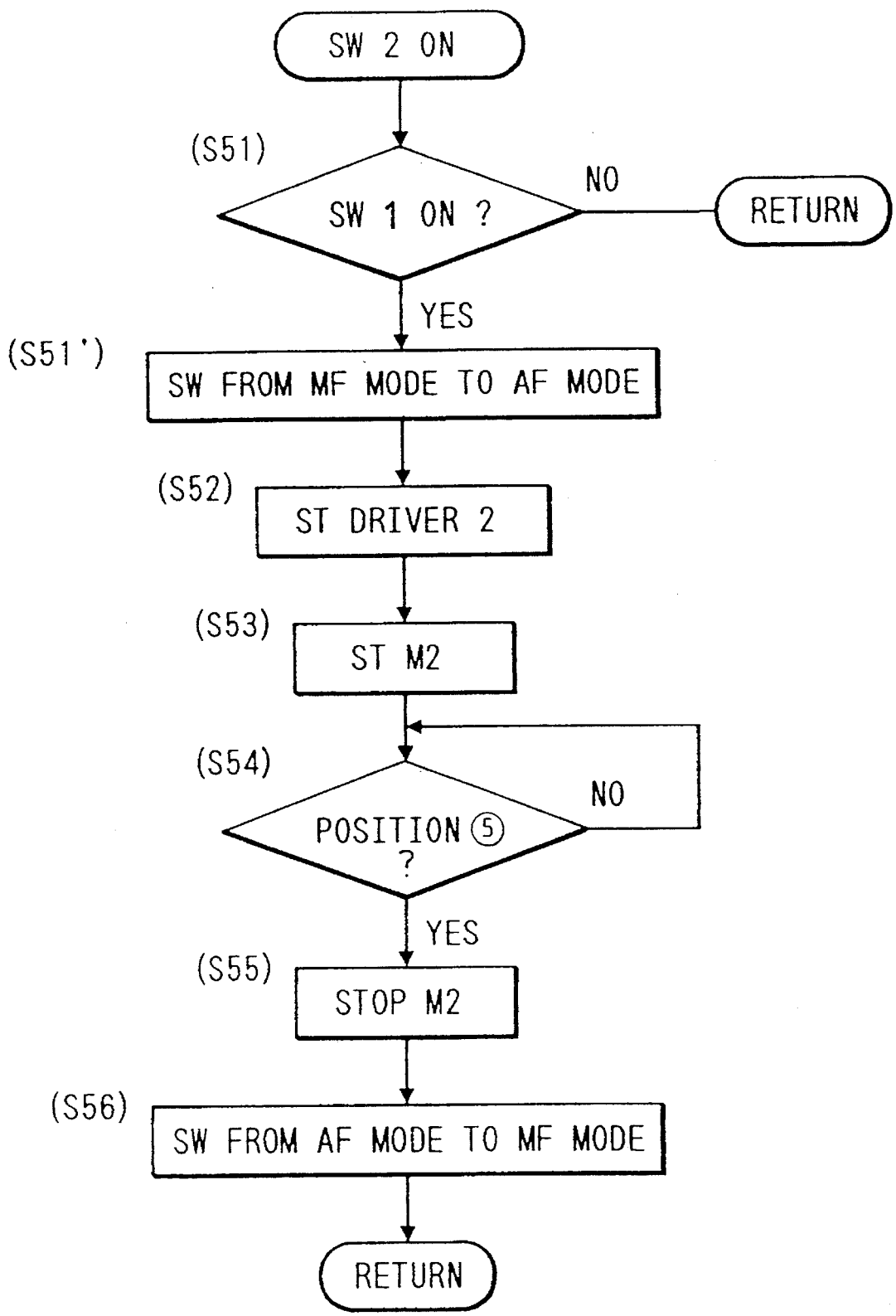
FIG. 11 is a flow chart showing the flow of the operation of another embodiment.

Now, the flow of the operation in this lens bodytube will be described with reference to the flow chart of FIG. 11. When the go-home switch SW2 is actuated at a suitable lens position after focus presetting is completed by the aforedescribed method, a go-home signal is output. Here, whether the focus preset switch SW1 is in its "on" position is first judged (step S51), and if an affirmative result is obtained, the solenoid 8 is operated to changeover the mode from the MF mode to the AF mode, whereby the drive force of the motor M2 becomes capable of being transmitted to the focusing optical system L2 (step S51'). Subsequently, the second driver 1104 is started by the positions of the pattern 125 and the brush 126 (step S52), to thereby start the driving of the motor M2 (step S53). Thereby, conversely to the time of focus presetting, the pattern 125 side is rotated by a driving mechanism similar to that during the AF mode. Then, whether the brush 26 has reached the boundary between ② and ③ (the home position ⑤ of FIG. 5) is judged (step S54), and if an affirmative result is obtained, the driving of the motor M2 is stopped (step S55). The rotation of the motor M2 before and after stopped is set similarly to the case of the go-home during the AF mode. After the driving of the pattern 125 is stopped at the home position P, the solenoid 8 is operated conversely to the aforedescribed case to changeover the mode from the AF mode to the MF mode, thereby operatively associating the MF ring and the focusing optical system L2 with each other (step S56). In this manner, the go-home in the MF mode is completed.

The setting of the direction and speed of rotation of the pattern 125 is similar to that in the case of the go-home in the aforedescribed AF mode.

In the above-described system, the lens driving to the home position is effected as long as the go-home switch SW2 is actuated. After the completion of the driving, the lens continues to be held at the home position, but if the actuation of the go-home switch SW2 is discontinued, the go-home signal input to the CPU 1100 in the lens will no longer be input. The CPU 1100 in the lens stops the driving control of the motor M2 based on the go-home signal, and immediately operates the solenoid 8 to changeover the mode from the AF mode to the MF mode, thereby operatively associating the MF ring and the focusing optical system L2 with each other.

Only during the go-home when as described above, the lens bodytube is set to the MF mode by the mode changeover switch 113, the changeover of the AF mode and the MF mode is forcibly effected irrespective of the operation of the mode changeover switch 113.

Even if the focus preset switch SW1 has not been actuated, that is, the lens position has not been stored after the power-on of the camera, the go-home operation is carried out by actuating the go-home switch SW2 to drive the lens to the lens position stored in the previous photographing operation. Thus, it is not necessary to continuously monitor the difference between the stored lens position and the current lens position and the waste of power consumption is prevented.

In the present embodiment, the pattern and the brush are used as the positioning means for the focus preset. Other positioning means of non-contact type such as a magnetic system or an optical system which uses a photo-interrupter and a transparent slit pattern or a may be used.

In accordance with the present embodiment, any position of the photographing lens is stored and the photographing lens may be immediately driven to the stored position upon command. Thus, once the lens is focused to an object and lens position is stored, the lens can be rapidly focused to that object by actuating the go-home switch SW2 during the photographing of another object. Thus, even if a distance between both objects is large, the time required for focusing is significantly reduced and the operability is improved.

In accordance with the present invention, when the AF mode with preference to MF is selected by the mode selection means, the MF mode is attained without additional selection operation during the AF mode by rotating the manual ring.

Accordingly, the normal photographing may be done in the AF mode, and when an object which is hard to be focused is to be photographed or the intentionally defocused photograph is to be taken, the manual ring may be rotated to smoothly effect the manual focusing.

What is claimed is:

1. A lens bodytube having an auto-focusing mode in which a photographing lens is automatically driven to an in-focus position by a drive force of a motor and a manual focusing mode in which the photographing lens is driven to an in-focus position by manually rotating a distance ring, comprising:

a rotary ring for driving the photographing lens along an optical axis as said rotary ring is rotated;

a movable member driven to a first position in the auto-focusing mode and to a second position in the manual focusing mode;

first means for engaging with said movable member when said movable member is at said first position to couple said motor to said rotary ring to transmit a drive force of said motor to said rotary ring;

second means for engaging with said movable member when said movable member is at said second position to couple said distance ring to said rotary ring to transmit a manual drive force from said distance ring to said rotary ring; and switching means responsive to manual rotation of said distance ring when said movable member is at said first position in the auto-focusing mode to drive said movable member from said first position to said second position to enable manual focusing.

2. A lens bodytube according to claim 1, wherein said switching means automatically returns said movable member from said second position to said first position at a predetermined time after the manual rotation of said distance ring has been stopped.

3. A lens bodytube having an auto-focusing mode in which a photographing lens is automatically driven to an in-focus position by a drive force of a motor and a manual focusing mode in which the photographing lens is driven to an in-focus position by manually rotating a distance ring, comprising:

a rotary ring for driving the photographing lens along an optical axis as said rotary ring is rotated;

a movable member driven to a first position in the auto-focusing mode and to a second position in the manual focusing mode;

a first member for engaging with said movable member when said movable member is at said first position to couple said motor to said rotary ring to transmit a drive force of said motor to said rotary ring;

a second member for engaging with said movable member when said movable member is at said second position to couple said distance ring to said rotary ring to transmit a manual drive force from said distance ring to said rotary ring; and a switching member to drive said movable member from said first position to said second position, in response to manual rotation of said distance ring when said movable member is at said first position in the auto-focusing mode, to enable manual focusing.

4. A lens bodytube according to claim 3, wherein said switching member automatically returns said movable member from said second position to said first position at a predetermined time after the manual rotation of said distance ring has been stopped.

5. A lens bodytube according to claim 3, wherein said movable member includes a solenoid-driven member which shifts in an optical axis direction, based on an electric signal generated by rotating said distance ring.

6. A lens bodytube according to claim 5, wherein the solenoid is provided at an outside periphery of said rotary ring.

7. A lens bodytube according to claim 3, including a rotation detector which detects a rotation of said distance ring to generate an electric signal to cause said switching member to drive said movable member.

* * * * *